(12) United States Patent
Cheon et al.

(10) Patent No.: US 10,759,400 B2
(45) Date of Patent: Sep. 1, 2020

(54) VEHICLE CONTROL APPARATUS AND METHOD FOR CONTROLLING THE SAME

(71) Applicant: MANDO CORPORATION, Gyeonggi-do (KR)

(72) Inventors: Seyoung Cheon, Gyeonggi-do (KR); Byunghak Kwak, Gyeonggi-do (KR); Sukku Kim, Gyeonggi-do (KR); Seong Ho Choi, Gyeonggi-do (KR); Jung Hun Han, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 256 days.

(21) Appl. No.: 15/994,916

(22) Filed: May 31, 2018

(65) Prior Publication Data
US 2018/0345923 A1 Dec. 6, 2018

(30) Foreign Application Priority Data
Jun. 5, 2017 (KR) .......................... 10-2017-0069691

(51) Int. Cl.
*B60T 8/171* (2006.01)
*B60T 8/172* (2006.01)
(Continued)

(52) U.S. Cl.
CPC .............. *B60T 8/171* (2013.01); *B60T 7/122* (2013.01); *B60T 8/172* (2013.01); *B60T 8/24* (2013.01); *B60T 2201/06* (2013.01)

(58) Field of Classification Search
CPC .......... B60T 8/171; B60T 7/122; B60T 8/172; B60T 8/24; B60T 2201/06
See application file for complete search history.

(56) References Cited

U.S. PATENT DOCUMENTS

| 6,629,026 B1 * | 9/2003 | Baraszu | B60K 6/48 701/22 |
| 2001/0038240 A1 * | 11/2001 | Yoshida | B60T 7/042 303/28 |

(Continued)

FOREIGN PATENT DOCUMENTS

| CN | 101631704 | 1/2010 |
| CN | 101660580 | 3/2010 |

(Continued)

OTHER PUBLICATIONS

Office Action dated May 29, 2020 for Chinese Patent Application No. 201810567961.9 and its English translation by Google Translate.

*Primary Examiner* — Hussein Elchanti
(74) *Attorney, Agent, or Firm* — Ladas & Parry, LLP

(57) ABSTRACT

A vehicle control apparatus and a method for controlling the same are disclosed. The vehicle control apparatus includes an inputter, a determiner, and a controller. The inputter receives an automatic vehicle hold (AVH) switch operation signal from an AVH device, and receives a current vehicle movement value sensed by a sensing device and a current vehicle brake force value of a brake device that generates brake force in response to activation of the AVH device. The determiner determines whether the received AVH switch operation signal transitions from an ON state to an AVH entry state, determines whether vehicle movement occurs on the basis of the received current vehicle movement value during an AVH retention time in the AVH entry state, and determines that the current vehicle brake force value is in an abnormal state when vehicle movement occurs. The controller receives the current vehicle movement value and the current vehicle brake force value, and transmits a command for judgment to the determiner.

18 Claims, 17 Drawing Sheets

(51) Int. Cl.
*B60T 8/24* (2006.01)
*B60T 7/12* (2006.01)

(56) References Cited

U.S. PATENT DOCUMENTS

| | | | | |
|---|---|---|---|---|
| 2003/0183431 | A1* | 10/2003 | Cikanek | B60K 6/48 180/65.6 |
| 2004/0207257 | A1* | 10/2004 | Faye | B60T 8/3275 303/125 |
| 2006/0004509 | A1* | 1/2006 | Teslak | B60T 1/10 701/84 |
| 2006/0258508 | A1* | 11/2006 | Tanioka | F02N 11/0803 477/203 |
| 2008/0177434 | A1* | 7/2008 | Moran | B60K 6/12 701/22 |
| 2009/0115247 | A1* | 5/2009 | Leiber | B60T 8/4077 303/154 |
| 2017/0369047 | A1* | 12/2017 | Okada | B60T 13/662 |

FOREIGN PATENT DOCUMENTS

| | | |
|---|---|---|
| CN | 103213587 | 7/2013 |
| CN | 103338987 | 10/2013 |
| CN | 103818367 | 5/2014 |
| CN | 104755336 | 7/2015 |
| CN | 105517861 | 4/2016 |
| DE | 10 2016 011 971 | 4/2017 |
| KR | 10-2013-0047817 | 5/2013 |
| KR | 10-1541711 | 7/2015 |

* cited by examiner

VEHICLE CONTROL APPARATUS AND METHOD FOR CONTROLLING THE SAME

CROSS-REFERENCE TO RELATED APPLICATION

This application is based on and claims priority under 35 U.S.C. § 119 to Korean Patent Application No. 10-2017-0069691, filed on Jun. 5, 2017 in the Korean Intellectual Property Office, the disclosure of which is incorporated by reference in its entirety.

BACKGROUND

1. Field

Embodiments of the present disclosure relate to a vehicle control apparatus and a method for controlling the same.

2. Description of the Related Art

Generally, a conventional brake apparatus for a vehicle is designed to determine a brake state by controlling the speed of the vehicle in a manner that the vehicle can stop in necessary situations.

For example, Korean Patent Registration No. 10-1541711 (2017 Jul. 29) has disclosed a conventional vehicle that allows a brake resistance controller to perform a brake resistance function in a faulty state of a brake system or to inform a vehicle controller or a driver of an operation or non-operation state of the brake resistance function in the faulty state of the brake system, and a method for controlling braking of the conventional vehicle.

However, the above-mentioned conventional vehicle and method for controlling braking of the conventional vehicle have difficulty not only in increasing the accuracy of determining brake force of the vehicle, but also in increasing the efficiency of compensation of the brake force of the vehicle, resulting in reduction in braking efficiency of the vehicle.

CITED REFERENCE

Patent Document

Korean Patent Registration No. 10-1541711 (2015 Jul. 29)

SUMMARY

Therefore, it is an aspect of the present disclosure to provide a vehicle control apparatus for increasing the accuracy of determining brake force of a vehicle, and a method for controlling the same.

It is another aspect of the present disclosure to provide a vehicle control apparatus for improving the efficiency of compensation of brake force of a vehicle, and a method for controlling the same.

It is another aspect of the present disclosure to provide a vehicle control apparatus for preventing malfunction of an automatic vehicle hold (AVH) device during compensation of brake force of a vehicle, and a method for controlling the same.

It is another aspect of the present disclosure to provide a vehicle control apparatus for increasing reliability of a vehicle by suppressing anxiety about a current braking condition, and a method for controlling the same.

It is another aspect of the present disclosure to provide a vehicle control apparatus for improving the efficiency of vehicle braking while simultaneously reducing an overall braking time of the vehicle, and a method for controlling the same.

Additional aspects of the invention will be set forth in part in the description which follows and, in part, will be obvious from the description, or may be learned by practice of the invention.

In accordance with an aspect of the present disclosure, a vehicle control apparatus includes: an inputter configured to receive an automatic vehicle hold (AVH) switch operation signal from an AVH device, and receive a current vehicle movement value sensed by a sensing device and a current vehicle brake force value of a brake device that generates brake force in response to activation of the AVH device; a determiner configured to determine whether the received AVH switch operation signal transitions from an ON state to an AVH entry state, determine whether vehicle movement occurs on the basis of the received current vehicle movement value during an AVH retention time in the AVH entry state, and determine that the current vehicle brake force value is in an abnormal state when vehicle movement occurs; and a controller configured to receive the current vehicle movement value and the current vehicle brake force value, and transmit a command for judgment to the determiner.

The vehicle control apparatus may further include a compensator configured to supply a target hydraulic pressure value established in response to the current vehicle movement value to one or more wheels during the abnormal state, thereby compensating for vehicle brake force.

The vehicle control apparatus may further include a controller configured to turn off the AVH device when the target hydraulic pressure value is supplied to the wheel.

The inputter may receive a current vehicle gradient value and a current vehicle drive force value from the sensing device. The determiner may determine whether a vehicle gradient state is at a flat level on the basis of the received current vehicle gradient value when the vehicle movement occurs, may determine whether the current vehicle drive force value is higher than the current vehicle brake force value when the vehicle gradient state is at the flat level, may determine whether the vehicle movement successively occurs on the basis of the received current vehicle movement value when the current vehicle drive force value is higher than the current vehicle brake force value, and may determine the abnormal state of the current vehicle brake force value when the vehicle movement successively occurs.

The vehicle control apparatus may further include a compensator configured to supply, when the abnormal state is decided, a target hydraulic pressure value established in response to the current vehicle movement value to one or more wheels when the vehicle movement has successively occurred, thereby compensating for vehicle brake force.

The vehicle control apparatus may further include a controller configured to turn off the AVH device when the target hydraulic pressure value is supplied to the wheel in response to successive occurrence of the vehicle movement.

The vehicle control apparatus may further include an identifier configured to identify that the current vehicle brake force value is in the abnormal state, when the vehicle movement occurs.

The vehicle control apparatus may further include an identifier configured to identify that the current vehicle brake force value is in the abnormal state when the vehicle movement successively occurs.

The determiner may determine whether the AVH retention time has elapsed. The controller may perform switching to an electronic parking brake (EPB) device after lapse of the AVH retention time.

In accordance with another aspect of the present disclosure, a method for controlling a vehicle includes: receiving an automatic vehicle hold (AVH) switch operation signal from an AVH device; determining whether the received AVH switch operation signal transitions from an ON state to an AVH entry state; receiving a current vehicle movement value sensed by a sensing device and a current vehicle brake force value of a brake device that generates brake force in response to activation of the AVH device; and determining whether vehicle movement occurs on the basis of the received current vehicle movement value during an AVH retention time in the AVH entry state, and determining that the current vehicle brake force value is in an abnormal state when the vehicle movement occurs.

The method may further receive supplying a target hydraulic pressure value established in response to the current vehicle movement value to one or more wheels, when the abnormal state is decided, thereby compensating for brake force of the vehicle.

The method may further include turning off the AVH device when the target hydraulic pressure value is supplied to the wheel.

The method may further include receiving a current vehicle gradient value and a current vehicle drive force value from the sensing device, determining whether a vehicle gradient state is at a flat level on the basis of the received current vehicle gradient value when the vehicle movement occurs, determining whether the current vehicle drive force value is higher than the current vehicle brake force value when the vehicle gradient state is at the flat level, determining whether the vehicle movement successively occurs on the basis of the received current vehicle movement value when the current vehicle drive force value is higher than the current vehicle brake force value, and determining the abnormal state of the current vehicle brake force value when the vehicle movement successively occurs.

The method may further include, when the abnormal state is decided, supplying a target hydraulic pressure value established in response to the current vehicle movement value to one or more wheels when the vehicle movement has successively occurred, thereby compensating for vehicle brake force.

The method may further include turning off the AVH device when the target hydraulic pressure value is supplied to the wheel in response to successive occurrence of the vehicle movement.

The method may further include identifying that the current vehicle brake force value is in the abnormal state, when the vehicle movement occurs.

The method may further include identifying that the current vehicle brake force value is in the abnormal state, when the vehicle movement successively occurs.

The method may further include determining whether the AVH retention time has elapsed, and performing switching to an electronic parking brake (EPB) device after lapse of the AVH retention time.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
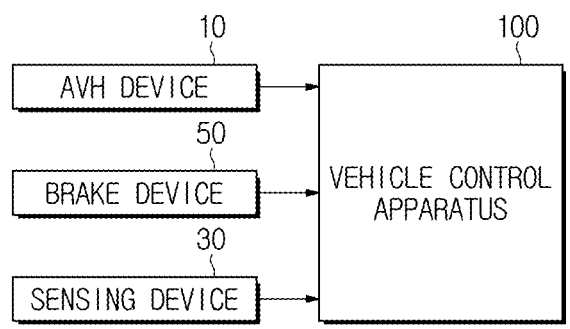
FIG. 1 is a block diagram illustrating an example of a connection state of a vehicle control apparatus connected to an automatic vehicle hold (AVH) device, a brake device, and a sensing device according to an embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

Figure 2:
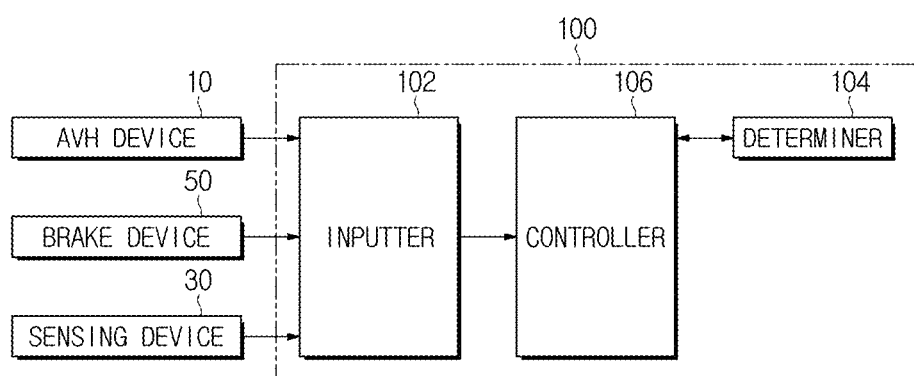
FIG. 2 is a block diagram illustrating an example of the vehicle control apparatus shown in FIG. 1.

FIG. 1 is a block diagram illustrating an example of a connection state of a vehicle control apparatus connected to an automatic vehicle hold (AVH) device, a brake device, and a sensing device according to an embodiment of the present disclosure. FIG. 2 is a block diagram illustrating an example of the vehicle control apparatus shown in FIG. 1.

Figure 3:
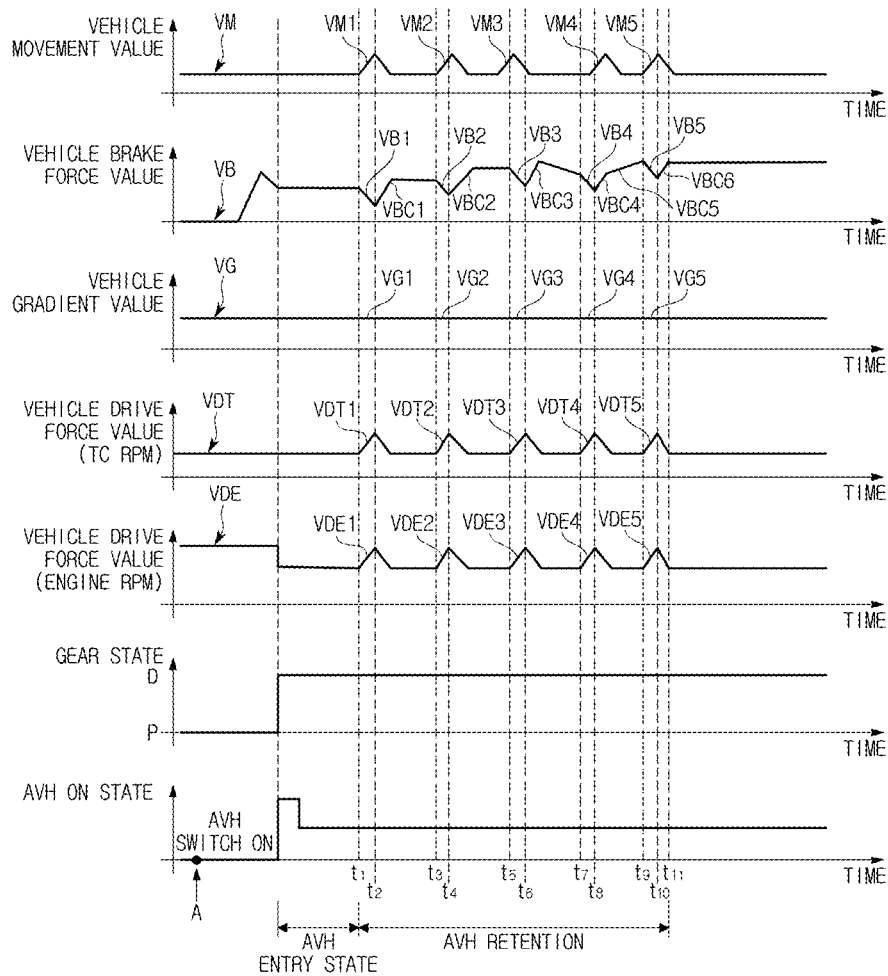
FIG. 3 is a waveform diagram illustrating a method for allowing a determiner shown in FIGS. 2 and 7 to decide whether current brake force of the vehicle is in an abnormal state and a method for allowing a compensator to compensate for brake force of the vehicle.
Figure 7:
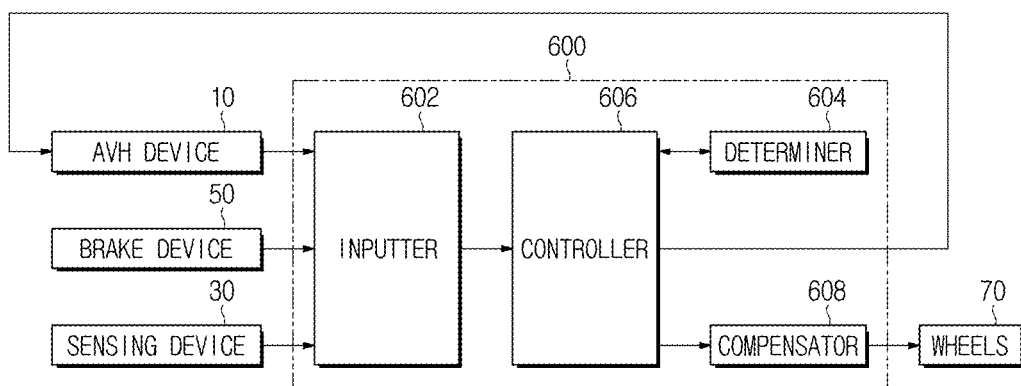
FIG. 7 is a block diagram illustrating another example of the vehicle control apparatus shown in FIG. 6.

FIG. 3 is a waveform diagram illustrating a method for allowing a determiner shown in FIGS. 2 and 7 to decide whether current brake force of the vehicle is in an abnormal state and a method for allowing a compensator to compensate for brake force of the vehicle.

Referring to FIGS. 1 to 3, the vehicle control apparatus 100 according to the embodiment of the present disclosure may include an inputter 102, a determiner 104, and a controller 106.

The inputter 102 may receive an AVH switch operation signal from an automatic vehicle hold (AVH) device 10.

The inputter 102 may receive not only a current vehicle movement value VM, but also a current vehicle brake force value VB of the brake device 50 that generates brake force in response to activation of the AVH device 10, from the sensing device 30. Here, the current vehicle movement value VM and the current vehicle brake force value VB are sensed by the sensing device 30.

For example, although not shown in the drawing, the sensing device 30 may include a wheel speed sensor (not shown) to detect a current vehicle movement value VM and a pressure sensor (not shown) to detect a current vehicle brake force value VB.

The determiner 104 may determine whether the AVH switch operation signal applied to the inputter 102 has transitioned from an ON state A to an AVH entry state upon receiving a control signal from the controller 106.

For example, the determiner 104 may determine whether a shift lever is in a drive (D) mode and the AVH switch operation signal applied to the inputter 102 has transitioned from the ON state A to the AVH entry state upon receiving a control signal from the controller 106.

When the AVH entry state is decided, the determiner 104 may determine occurrence or non-occurrence of vehicle movement on the basis of a current vehicle movement value VM1 that is applied to the inputter 102 during an AVH retention time t1~t2, upon receiving a control signal from the controller 106.

When occurrence of vehicle movement is decided, the determiner 104 may determine that the current vehicle brake force value VB1 is in an abnormal state.

The controller 106 may receive the current vehicle movement value VM and the current vehicle brake force value VB, and may transmit a command for judgment to the determiner 104.

The inputter 102 of the vehicle control apparatus 100 according to the embodiment of the present disclosure may further receive not only a current vehicle gradient value VG sensed by the sensing device 30, but also current vehicle drive force values VDT and VDE sensed by the sensing device 30.

For example, although not shown in the drawing, the sensing device 30 may include a longitudinal gravity acceleration sensor (not shown) to detect a current vehicle gradient value VG, and may include a transmission control (TC) RPM sensor (not shown) to detect a current vehicle drive force value VDT and an engine RPM sensor (not shown) to detect a current vehicle drive force value VDE.

When occurrence of vehicle movement is decided, the determiner 104 of the vehicle control device 100 according to the embodiment of the present disclosure may further determine whether the vehicle gradient state is at a flat level on the basis of the current vehicle gradient values VG1~VG5 applied to the inputter 102 upon receiving a control signal from the controller 106.

When the vehicle gradient state is at the flat level, the determiner 104 of the vehicle control apparatus 100 according to the embodiment of the present disclosure may further determine whether current vehicle drive force values VDT1~VDT5 and VDE1~VDE5 applied to the inputter 102 are higher than current vehicle brake force values VB1~VB5 upon receiving a control signal from the controller 106.

When the current vehicle drive force values VDT1~VDT5 and VDE1~VDE5 are higher than current vehicle brake force values VB1~VB5, the determiner 104 of the vehicle control apparatus 100 according to the embodiment of the present disclosure may further determine whether vehicle movement successively occurs on the basis of the current vehicle movement values VM1~VM5 applied to the inputter 102 during the AVH retention time t1~t11 upon receiving a control signal from the controller 106.

For example, when the current vehicle drive force values VDT1~VDT5 and VDE1~VDE5 are higher than the current vehicle brake force values VB1~VB5, the determiner 104 may further determine whether the vehicle has moved a predetermined number of times during a predetermined time on the basis of the current vehicle movement values VM1~VM5 applied to the inputter 102 during the AVH retention time t1~t11 upon receiving a control signal from the controller 106.

When the vehicle has successively moved, the determiner 104 of the vehicle control apparatus 100 according to the embodiment of the present disclosure may further determine that the current vehicle brake force values VB1~VB5 are in the abnormal state.

Figure 4:
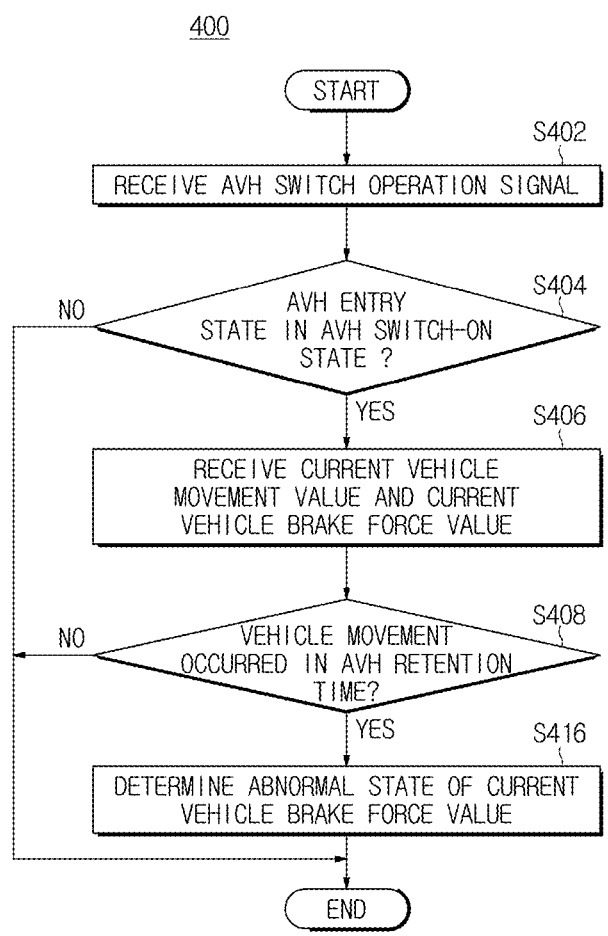
FIG. 4 is a flowchart illustrating an example of a method for controlling the vehicle control apparatus according to an embodiment of the present disclosure.

FIG. 4 is a flowchart illustrating an example of a method for controlling the vehicle control apparatus according to an embodiment of the present disclosure.

Figure 5:
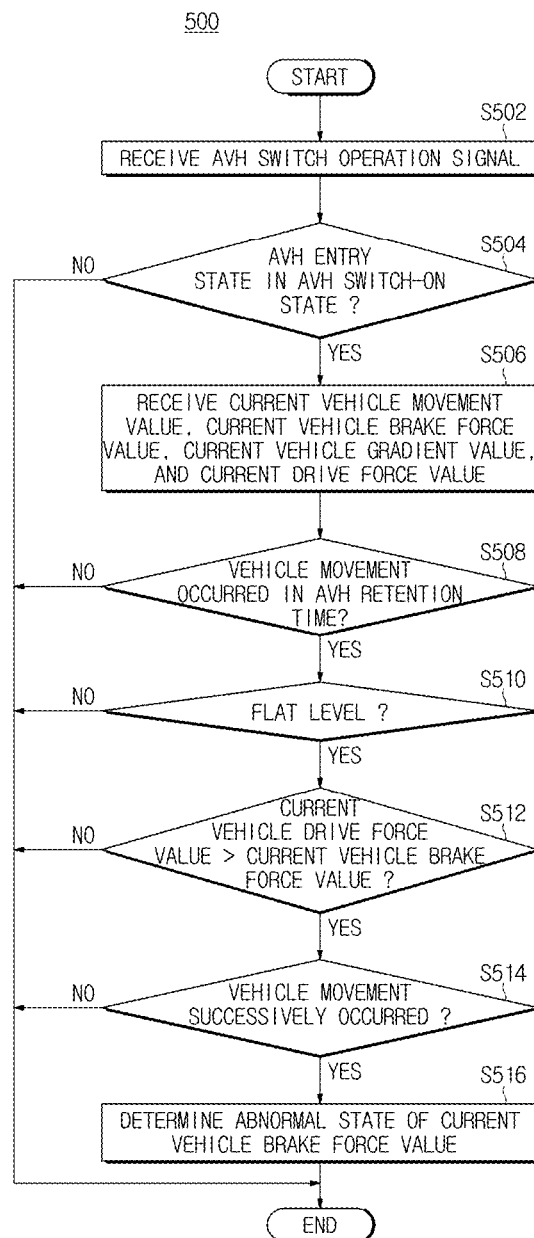
FIG. 5 is a flowchart illustrating another example of a method for controlling the vehicle control apparatus according to an embodiment of the present disclosure.

FIG. 5 is a flowchart illustrating another example of a method for controlling the vehicle control apparatus according to an embodiment of the present disclosure.

Referring to FIG. 4, a vehicle control method 400 for the vehicle control apparatus 100 of FIG. 2 may include a first input operation S402, a second decision operation S404, a second input operation S406, and second decision operations S408 and S416.

In the first input operation S402, the inputter 102 (see FIG. 2) may receive the AVH switch operation signal from the AVH device 10 (see FIG. 2).

In the first decision operation S404, the determiner 104 (see FIG. 2) may determine whether the AVH switch operation signal applied to the inputter 102 (see FIG. 2) has transitioned from the ON state A (see FIG. 3) to the AVH entry state upon receiving a control signal from the controller 106 (see FIG. 2).

In the second decision operation S406, the inputter 102 (see FIG. 2) may receive the current vehicle movement value VM (see FIG. 3) sensed by the sensing device 30 (see FIG. 2) and the current vehicle brake force value VB (see FIG. 3) of the brake device 50 (see FIG. 2) that generates brake force in response to activation of the AVH device 10 (see FIG. 2).

In the second decision operation S408, when the AVH entry state is decided, the determiner 104 (see FIG. 2) may determine whether the vehicle has moved on the basis of the current vehicle movement value VM1 (see FIG. 3) applied to the inputter 102 (see FIG. 2) during the AVH retention time t1~t2 (see FIG. 3) upon receiving a control signal from the controller 106 (see FIG. 2).

In the second decision operation S416, when occurrence of vehicle movement is decided, the determiner 104 (see FIG. 2) may determine that the current vehicle brake force value VB1 (see FIG. 3) is in the abnormal state.

Referring to FIG. 5, a vehicle control method 500 for the vehicle control apparatus 100 (see FIG. 2) according to the embodiment of the present disclosure may include a first input operation S502, a first decision operation S504, a second input operation S506, and second decision operations S508, S510, S512, S514, and S516.

In the first input operation S502, the inputter 102 (see FIG. 2) may receive the AVH switch operation signal from the AVH device 10 (see FIG. 2).

In the first decision operation S504, the determiner 104 (see FIG. 2) may determine whether the AVH switch operation signal applied to the inputter 102 (see FIG. 2) has transitioned from the ON state A (see FIG. 3) to the AVH entry state upon receiving a control signal from the controller 106 (see FIG. 2).

For example, in the first decision operation S504, the determiner 104 may determine whether the shift lever is in a drive (D) mode (see FIG. 3) and the AVH switch operation signal applied to the inputter 102 (see FIG. 2) has transitioned from the ON state A to the AVH entry state upon receiving a control signal from the controller 106 (see FIG. 2).

In the second decision operation S506, the inputter 102 (see FIG. 2) may receive the current vehicle movement value VM (see FIG. 3) sensed by the sensing device 30 (see FIG. 2), the current vehicle brake force value VB (see FIG. 3) of the brake device 50 (see FIG. 2) that generates brake force in response to activation of the AVH device 10 (see FIG. 2), a current vehicle gradient value VG (see FIG. 3) sensed by the sensing device 30 (see FIG. 30), and current vehicle drive force values VDT and VDE (see FIG. 3).

In the second decision operation S508, when the AVH entry state is decided, the determiner 104 (see FIG. 2) may determine whether the vehicle has moved on the basis of the current vehicle movement value VM1 (see FIG. 3) applied to the inputter 102 (see FIG. 2) during the AVH retention time t1~t2 (see FIG. 3) upon receiving a control signal from the controller 106 (see FIG. 2).

In the second decision operation S510, when occurrence of vehicle movement is decided, the determiner 104 (see FIG. 2) may determine whether the vehicle gradient state is at a flat level on the basis of the current vehicle gradient values VG1~VG5 (see FIG. 3) applied to the inputter 102 (see FIG. 2) upon receiving a control signal from the controller 106 (see FIG. 2).

In the second decision operation S512, when the vehicle gradient state is at the flat level, the determiner 104 (see FIG. 2) may determine whether current vehicle drive force values VDT1~VDT5 and VDE1~VDE5 (see FIG. 3) applied to the inputter 102 are higher than current vehicle brake force values VB1~VB5 (see FIG. 3) upon receiving a control signal from the controller 106.

In the second decision operation S514, when the current vehicle drive force values VDT1~VDT5 and VDE1~VDE5 (see FIG. 3) are higher than current vehicle brake force values VB1~VB5 (see FIG. 3), the determiner 104 (see FIG. 2) may determine whether the vehicle has successively moved on the basis of the current vehicle movement values VM1~VM5 (see FIG. 3) applied to the inputter 102 (see FIG. 2) during the AVH retention time t1~t11 (see FIG. 3) upon receiving a control signal from the controller 106 (see FIG. 2).

For example, in the second decision operation S514, when the current vehicle drive force values VDT1~VDT5 and VDE1~VDE5 (see FIG. 3) are higher than current vehicle brake force values VB1~VB5 (see FIG. 3), the determiner 104 (see FIG. 2) may determine whether the vehicle has successively moved a predetermined number of times on the basis of the current vehicle movement values VM1~VM5 applied to the inputter 102 (see FIG. 2) during the AVH retention time t1~t11 (see FIG. 3) upon receiving a control signal from the controller 106.

In the second decision operation S516, when the vehicle has successively moved, the determiner 104 (see FIG. 2) may determine that the current vehicle brake force values VB1~VB5 (see FIG. 3) are in the abnormal state.

Figure 6:
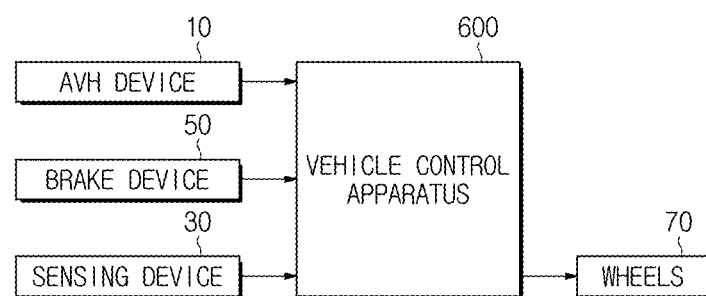
FIG. 6 is a block diagram illustrating another example of a connection state of a vehicle control apparatus connected to an AVH device, a brake device, a sensing device, and wheels according to an embodiment of the present disclosure.

FIG. 6 is a block diagram illustrating another example of a connection state of the vehicle control apparatus connected to the AVH device, the brake device, the sensing device, and wheels according to an embodiment of the present disclosure. FIG. 7 is a block diagram illustrating another example of the vehicle control apparatus shown in FIG. 6.

Referring to FIGS. 6 and 7, a vehicle control apparatus 600 may include an inputter 602, a determiner 604, and a controller 606 in the same manner as in the vehicle control apparatus 100 (see FIG. 2).

Functions of constituent elements of the vehicle control apparatus 600 and the connection relationship therebetween are identical to those of constituent elements of the vehicle control apparatus 100 (see FIG. 2), and as such a detailed description thereof will herein be omitted for convenience of description.

The vehicle control apparatus 600 may further include a compensator 608.

When occurrence of the abnormal state is decided by the determiner 604, the compensator 608 may transmit a target hydraulic pressure value VBC1 established in response to the current vehicle movement value VM1 to wheels 70 upon receiving a control signal from the controller 606, thereby compensating for brake force of the vehicle.

Referring to FIGS. 3 and 7, when occurrence of the abnormal state is decided by the determiner 504, the compensator 508 may transmit target hydraulic pressure values VBC1~VBC6 established in response to the current vehicle movement values VM1~VM5 to the wheels 70 according to occurrence of successive vehicle movement upon receiving a control signal from the controller 606, thereby compensating for brake force of the vehicle.

For example, when occurrence of the abnormal state is decided by the determiner 504, the compensator 508 may transmit target hydraulic pressure values VBC1~VBC6 established in response to the current vehicle movement values VM1~VM5 to the wheels 70 when the vehicle has moved a predetermined number of times during a predetermined time upon receiving a control signal from the controller 606, thereby compensating for brake force of the vehicle.

When the target hydraulic pressure values are supplied to the wheels 70, the controller 606 of the vehicle control apparatus 600 may turn off the AVH device 10.

Referring to FIGS. 3 and 7, when the target hydraulic pressure values VBC1~VBC6 are supplied to the wheels 70 in response to occurrence of successive vehicle movement, the controller 606 of the vehicle control apparatus 600 may turn off the AVH device 10.

For example, when the target hydraulic pressure values VBC1~VBC6 are supplied to the wheels 70 at a specific time where the vehicle has moved a predetermined number of times during a predetermined time, the controller 606 may turn off the AVH device 10.

Figure 8:
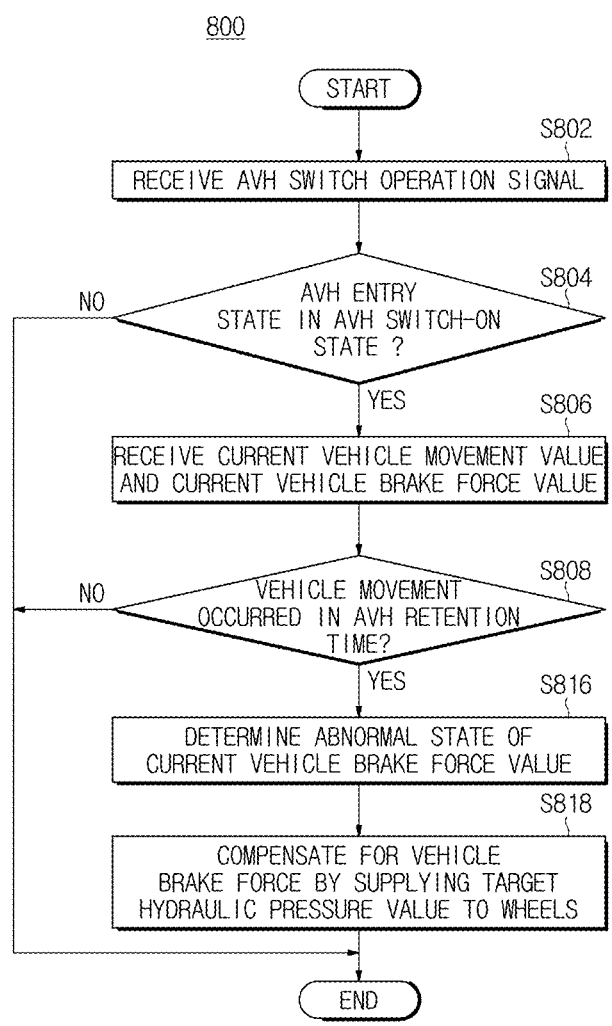
FIG. 8 is a flowchart illustrating still another example of a method for controlling the vehicle control apparatus according to an embodiment of the present disclosure.
Figure 9:
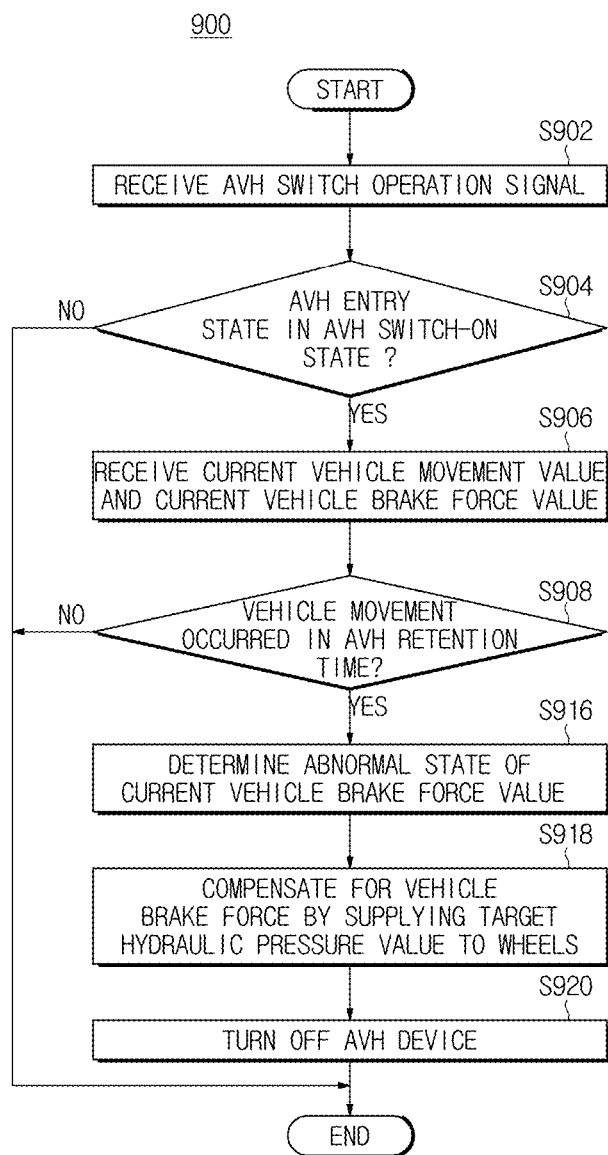
FIG. 9 is a flowchart illustrating still another example of a method for controlling the vehicle control apparatus according to an embodiment of the present disclosure.

FIG. 8 is a flowchart illustrating still another example of a method for controlling the vehicle control apparatus according to an embodiment of the present disclosure. FIG. 9 is a flowchart illustrating still another example of a method for controlling the vehicle control apparatus according to an embodiment of the present disclosure.

Figure 10:
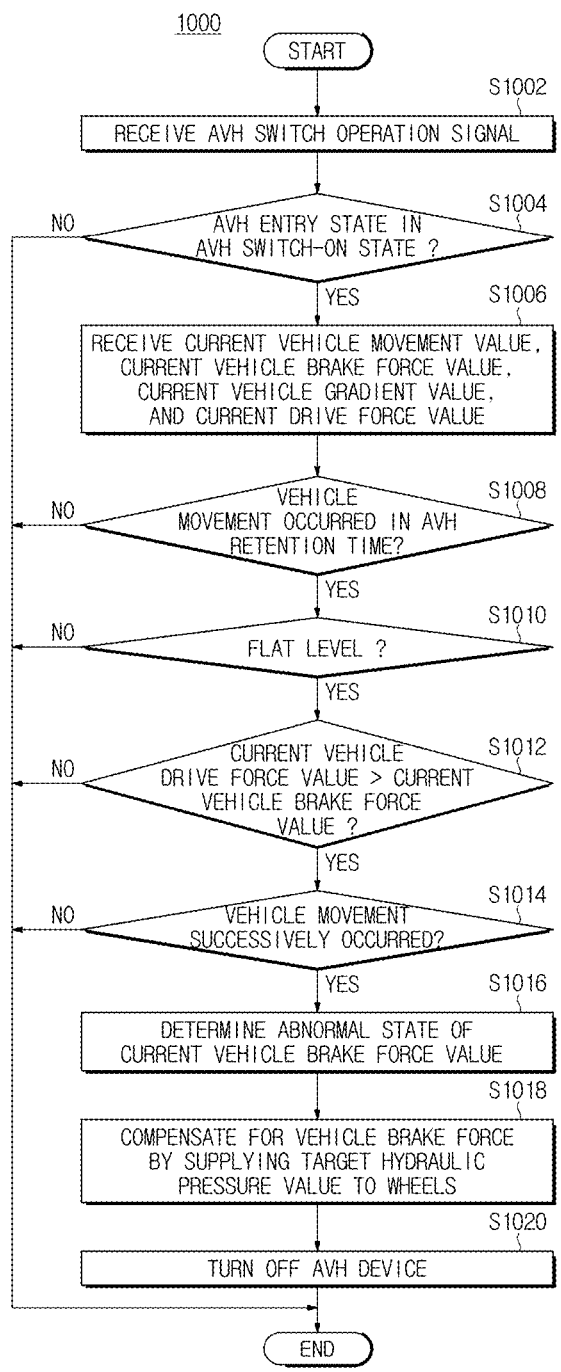
FIG. 10 is a flowchart illustrating still another example of a method for controlling the vehicle control apparatus according to an embodiment of the present disclosure.

FIG. 10 is a flowchart illustrating still another example of a method for controlling the vehicle control apparatus according to an embodiment of the present disclosure.

Referring to FIGS. 8 to 10, vehicle control methods 800, 900, and 1000 for the vehicle control apparatus 600 (see FIG. 6) according to the embodiments of the present disclosure may include first input operations S802 to S1002, first decision operations S804 to S1004, second input operations S806, S906, and S1006, and second decision operations S808, S908, S816, S916, S1008, S1010, S1012, S1014, and S1016 in the same manner as in the vehicle control methods 400 and 500 (see FIGS. 4 and 5) for the vehicle control apparatus 100 (see FIG. 2).

Functions of respective operations shown in the vehicle control methods 800 to 1000 of the vehicle control apparatus 600 (see FIG. 7) and the connection relationship therebetween are identical to those of the vehicle control methods 400 and 500 (see FIGS. 4 and 5) of the vehicle control apparatus 100 (see FIG. 2), and as such a detailed description thereof will herein be omitted for convenience of description.

The vehicle control methods 800 to 1000 of the vehicle control apparatus 600 (see FIG. 7) may include first compensation operations S808 and S918 and a second compensation operation S1018.

The first compensation operations S818 and S918 may be performed after completion of the second decision operations S816 and S916.

In the first compensation operations S808 and S918, when occurrence of the abnormal state is decided by the determiner 604 (see FIG. 7), the compensator 608 (see FIG. 7) may transmit a target hydraulic pressure value VBC1 (see FIG. 3) established in response to the current vehicle movement value VM1 (see FIG. 3) to wheels 70 (see FIG. 7) upon receiving a control signal from the controller 606, thereby compensating for brake force of the vehicle.

The second compensation operation S1018 may be performed after completion of the second decision operation S1016.

In the second compensation operation S1018, when occurrence of the abnormal state is decided by the determiner 604 (see FIG. 7), the compensator 608 (see FIG. 7) may transmit target hydraulic pressure values VBC1~VBC6 (see FIG. 3) established in response to the current vehicle movement values VM1~VM5 (see FIG. 3) to the wheels 70 (see FIG. 7) when the vehicle has successively moved upon receiving a control signal from the controller 606 (see FIG. 7), thereby compensating for brake force of the vehicle.

For example, in the second compensation operation S1018, when occurrence of the abnormal state is decided by the determiner 604 (see FIG. 7), the compensator 608 (see FIG. 7) may transmit target hydraulic pressure values VBC1~VBC6 (see FIG. 3) established in response to the current vehicle movement values VM1~VM5 (see FIG. 3) to the wheels 70 (see FIG. 7) when the vehicle has moved a predetermined number of times during a predetermined time upon receiving a control signal from the controller 606 (see FIG. 7), thereby compensating for brake force of the vehicle.

Referring to FIGS. 9 and 10, vehicle control methods 900 and 1000 for the vehicle control apparatus 600 (see FIG. 7) may include a first control operation S920 and a second control operation S1020.

The first control operation S920 may be performed after completion of the first compensation operation S918.

In the first control operation S920, when the compensator 608 (see FIG. 7) supplies the target hydraulic pressure value VBC1 (see FIG. 3) to wheels 70 (see FIG. 7), the controller 606 (see FIG. 7) may turn off the AVH device 10 (see FIG. 7).

The second control operation S1020 may be performed after completion of the second compensation operation S1018.

In the second control operation S1020, when the compensator 608 (see FIG. 7) supplies the target hydraulic pressure values VBC1~VBC6 (see FIG. 3) to wheels 70 (see FIG. 7) in response to occurrence of successive vehicle movement, the controller 606 (see FIG. 7) may turn off the AVH device 10 (see FIG. 7).

For example, in the second control operation S1020, when the compensator 608 (see FIG. 7) supplies target hydraulic pressure values VBC1~VBC6 (see FIG. 3) when the vehicle has moved a predetermined number of times during a predetermined time, the controller 606 (see FIG. 7) may turn off the AVH device 10 (see FIG. 7).

Figure 11:
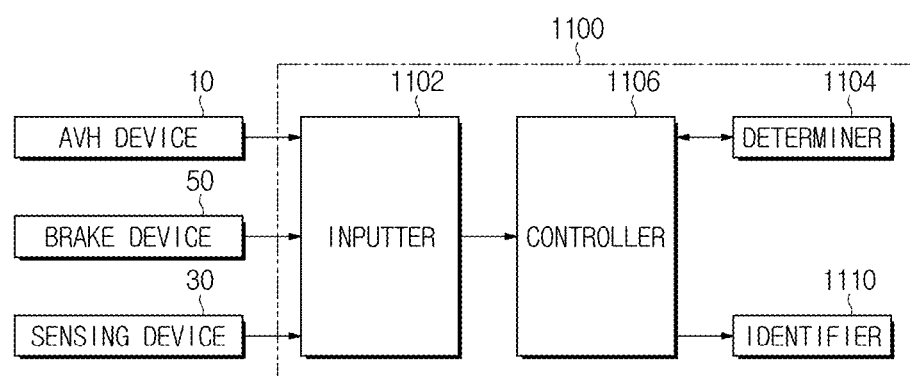
FIG. 11 is a block diagram illustrating still another example of the vehicle control apparatus according to an embodiment of the present disclosure.

FIG. 11 is a block diagram illustrating still another example of the vehicle control apparatus according to an embodiment of the present disclosure.

Referring to FIG. 11, a vehicle control apparatus 1100 according to the embodiment of the present disclosure may include an inputter 1102, a determiner 1104, and a controller 1106 in the same manner as in the vehicle control apparatus 100 (see FIG. 2).

Functions of constituent elements of the vehicle control apparatus 1100 and the connection relationship therebetween are identical to those of constituent elements of the vehicle control apparatus 100 (see FIG. 2), and as such a detailed description thereof will herein be omitted for convenience of description.

The vehicle control apparatus 1100 may further include an identifier 1110.

When occurrence of vehicle movement is decided by the determiner 1104, the identifier 1110 may identify that the current vehicle brake force value is in the abnormal state upon receiving a control signal from the controller 1106.

When occurrence of successive vehicle movement is decided by the determiner 1104, the identifier 1110 may identify that the current vehicle brake force value is in the abnormal state upon receiving a control signal from the controller 1106.

For example, although not shown in the drawing, when the sensing device 30 includes a pressure sensor (not shown) to measure pressure of each wheel, the identifier 1110 may identify that the current vehicle brake force value is in the abnormal state using an alarm device (not shown) configured to warn of pressure leakage and the necessity of pad replacement.

In another example, when the sensing device 30 includes a pressure sensor (not shown) incapable of measuring wheel pressure, the identifier 1110 may identify that the current vehicle brake value is in the abnormal state by turning on a warning lamp (not shown) indicating the abnormal state of the brake device 50.

Although not shown in the drawing, the identifier 1110 may include at least one of a human machine interface (HMI) module (not shown) and a head-up display (HUD) module (not shown), each of which can allow a user (i.e., a driver) to recognize vehicle information or vehicle states through interfacing between the user and a machine, such that the identifier 1110 may identify that the current vehicle brake force value is in the abnormal state by activating at least one of an HMI message display function of the HMI module (not shown) and a HUD message display function of the HUD module (not shown).

Figure 12:
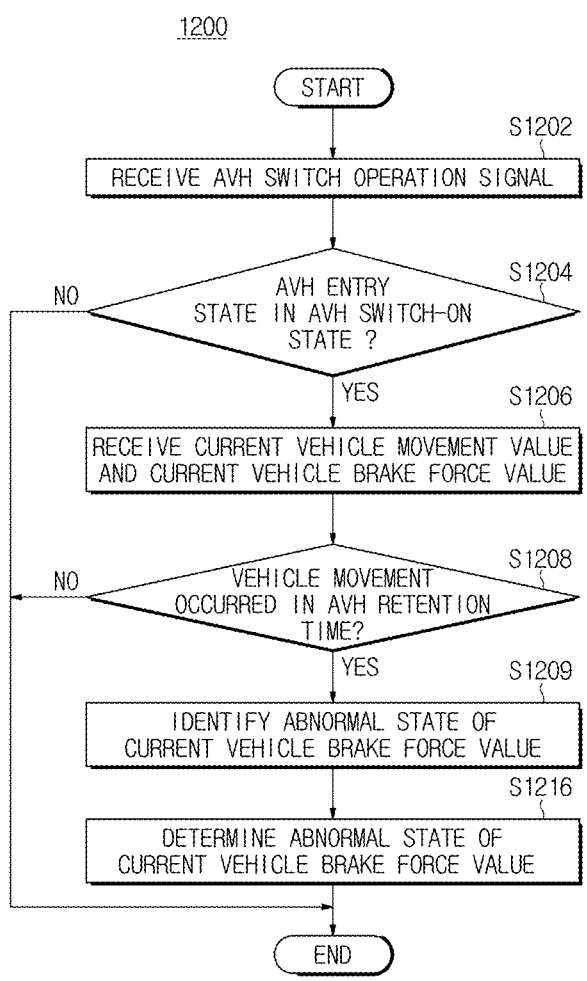
FIG. 12 is a flowchart illustrating still another example of a method for controlling the vehicle control apparatus according to an embodiment of the present disclosure.
Figure 13:
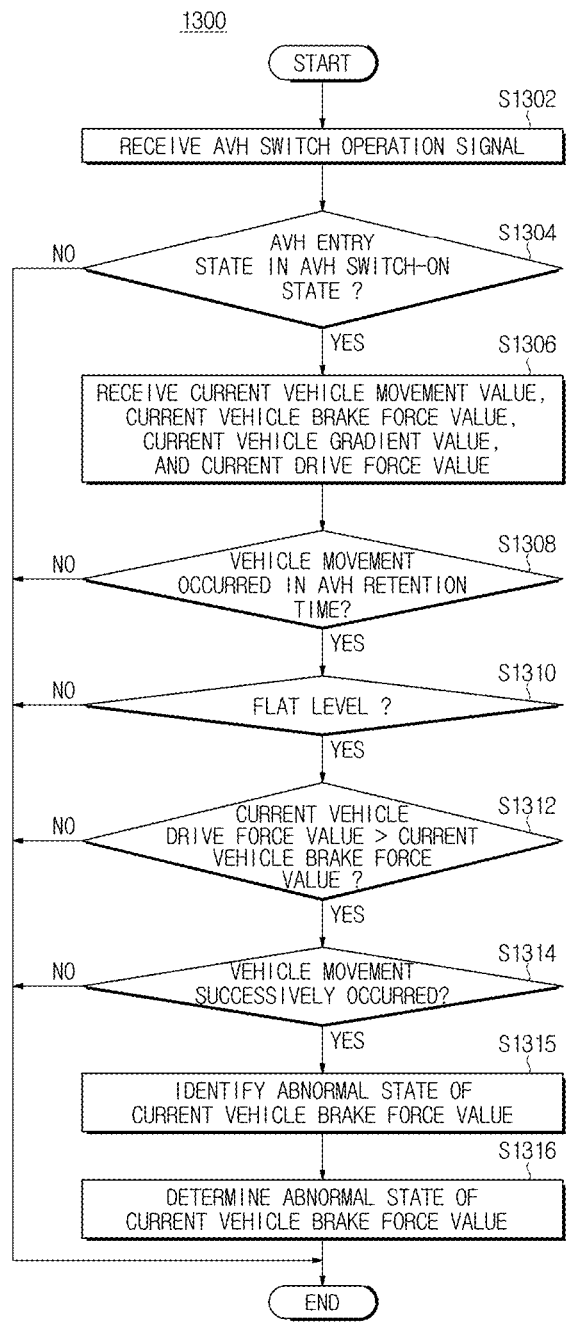
FIG. 13 is a flowchart illustrating still another example of a method for controlling the vehicle control apparatus according to an embodiment of the present disclosure.

FIG. 12 is a flowchart illustrating still another example of a method for controlling the vehicle control apparatus according to an embodiment of the present disclosure. FIG. 13 is a flowchart illustrating still another example of a method for controlling the vehicle control apparatus according to an embodiment of the present disclosure.

Referring to FIGS. 12 and 13, vehicle control methods 1200 and 1300 for the vehicle control apparatus 1100 (see FIG. 11) according to the embodiments of the present disclosure may include first input operations S1202 and S1302, first decision operations S1204 and S1304, second input operations S1206 and S1306, and second decision operations S1208, S1216, S1308, S1310, S1312, S1314, and S1316 in the same manner as in the vehicle control methods 400 and 500 (see FIGS. 4 and 5) for the vehicle control apparatus 100 (see FIG. 2).

Functions of respective operations shown in the vehicle control methods 1200 and 1300 of the vehicle control apparatus 1100 (see FIG. 11) and the connection relationship therebetween are identical to those of the vehicle control methods 400 and 500 (see FIGS. 4 and 5) of the vehicle control apparatus 100 (see FIG. 2), and as such a detailed description thereof will herein be omitted for convenience of description.

The vehicle control methods 1200 and 1300 of the vehicle control apparatus 1100 (see FIG. 11) may include a first identification operation S1209 and a second identification operation S1315.

The first identification operation S1209 may be performed after completion of the second decision operation S1208.

Although not shown in the drawing, the first identification operation S1209 may be synchronized with the second decision operation S1216 as necessary.

In the first identification operation S1209, when occurrence of vehicle movement is decided by the determiner 1104 (see FIG. 11), the identifier 1110 (see FIG. 11) may identify that the current vehicle brake force value is in the abnormal state upon receiving a control signal from the controller 1106 (see FIG. 11).

The second identification operation S1315 may be performed after completion of the second decision operation S1314.

Although not shown in the drawing, the first identification operation S1315 may be synchronized with the second decision operation S1316 as necessary.

In the second identification operation S1315, when occurrence of successive vehicle movement is decided by the determiner 1104 (see FIG. 11), the identifier 1110 (see FIG. 11) may identify that the current vehicle brake force value is in the abnormal state upon receiving a control signal from the controller 1106 (see FIG. 11).

Figure 14:
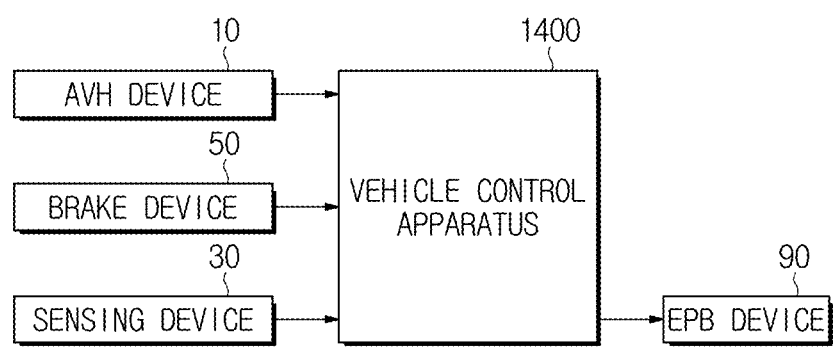
FIG. 14 is a block diagram illustrating still another example of a connection state of a vehicle control apparatus connected to an AVH device, a brake device, a sensing device, and an electronic parking brake (EPB) device according to an embodiment of the present disclosure.
Figure 15:
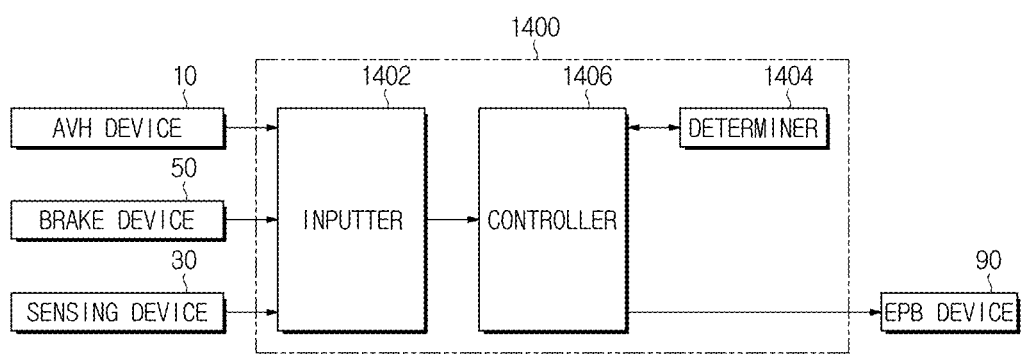
FIG. 15 is a block diagram illustrating still another example of the vehicle control apparatus shown in FIG. 14.

FIG. 14 is a block diagram illustrating still another example of a connection state of the vehicle control apparatus connected to the AVH device, the brake device, the sensing device, and the EPB device according to an embodiment of the present disclosure. FIG. 15 is a block diagram illustrating still another example of the vehicle control apparatus shown in FIG. 14.

Referring to FIGS. 14 and 15, a vehicle control apparatus 1400 according to the embodiment of the present disclosure may include an inputter 1402, a determiner 1404, and a controller 1406 in the same manner as in the vehicle control apparatus 100 (see FIG. 2).

Functions of constituent elements of the vehicle control apparatus 1400 and the connection relationship therebetween are identical to those of constituent elements of the vehicle control apparatus 100 (see FIG. 2), and as such a detailed description thereof will herein be omitted for convenience of description.

The determiner 1404 of the vehicle control apparatus 1400 may further determine whether the AVH retention time t1~t11 has elapsed.

When lapse of the AVH retention time t1~t11 is decided by the determiner 1404, the controller 1406 of the vehicle control apparatus 1400 may perform switching to the EPB device 90.

Figure 16:
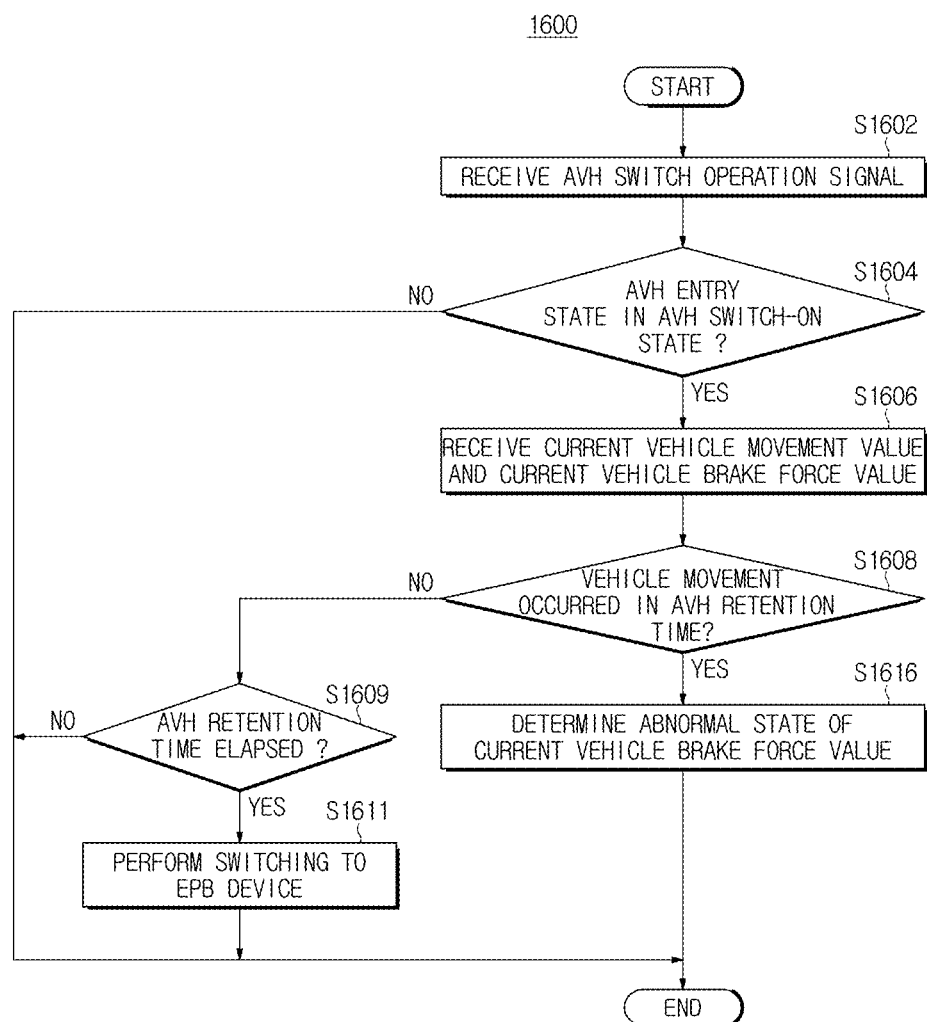
FIG. 16 is a flowchart illustrating still another example of a method for controlling the vehicle control apparatus according to an embodiment of the present disclosure.
Figure 17:
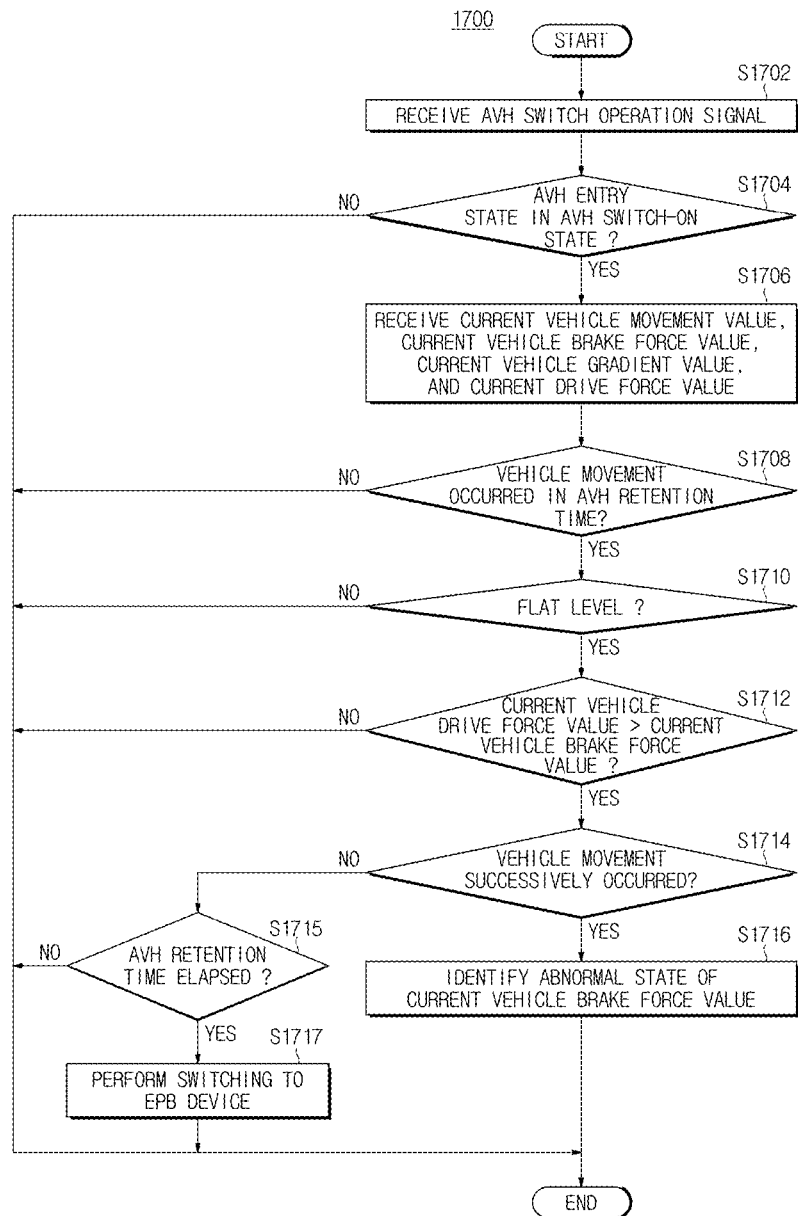
FIG. 17 is a flowchart illustrating still another example of a method for controlling the vehicle control apparatus according to an embodiment of the present disclosure.

FIG. 16 is a flowchart illustrating still another example of a method for controlling the vehicle control apparatus according to an embodiment of the present disclosure. FIG. 17 is a flowchart illustrating still another example of a method for controlling the vehicle control apparatus according to an embodiment of the present disclosure.

Referring to FIGS. 16 and 17, vehicle control methods 1600 and 1700 for the vehicle control apparatus 1400 (see FIG. 15) according to the embodiments of the present disclosure may include first input operations S1602 and S1702, first decision operations S1604 and S1704, second input operations S1606 and S1706, and second decision operations S1608, S1616, S1708, S1710, S1712, S1714, and S1716 in the same manner as in the vehicle control methods 400 and 500 (see FIGS. 4 and 5) for the vehicle control apparatus 100 (see FIG. 2).

Functions of respective operations shown in the vehicle control methods 1600 and 1700 of the vehicle control apparatus 1500 (see FIG. 15) and the connection relationship therebetween are identical to those of the vehicle control methods 400 and 500 (see FIGS. 4 and 5) of the vehicle control apparatus 100 (see FIG. 2), and as such a detailed description thereof will herein be omitted for convenience of description.

The vehicle control methods 1600 and 1700 of the vehicle control apparatus 1500 (see FIG. 15) may include second decision operations S1609 and S1715 and third control operations S1611 and S1717.

The second decision operation S1609 may be performed after completion of the second decision operation S1608.

Although not shown in the drawing, the second decision operation S1609 may be performed after completion of the second decision operation S1616.

The second decision operation S1715 may be performed after completion of the second decision operation S1714.

Although not shown in the drawing, the second decision operation S1715 may be performed after completion of the second decision operation S1716.

In the second decision operations S1609 and S1715, the determiner 1404 (see FIG. 15) may determine that the AVH retention time has elapsed upon receiving a control signal from the controller 1406 (see FIG. 15).

The third control operations S1611 and S1717 may be performed after completion of the second decision operations S1609 and S1715.

In the third control operations S1611 and S1717, when lapse of the AVH retention time is decided by the determiner 1404 (see FIG. 15), the controller 1406 (see FIG. 15) may perform switching to the EPB device 90 (see FIG. 15).

Meanwhile, although the vehicle control apparatuses 100, 600, and 1400 according to the embodiments of the present disclosure have disclosed that the inputters 102, 602, and 1402, the determiners 104, 604, and 1404, the controllers 106, 606, and 1406, and the compensator 608 are separated from one another to clearly explain characteristics of the present disclosure, each of the inputters 102, 602, and 1402, each of the determiners 104, 604, and 1404, and each of the controllers 106, 606, and 1406 may be respectively implemented as Electronic Control Units (ECUs) or Micro Control Units (MCUs) configured to control overall operation of the vehicle as well as to perform input and judgment functions. Although not shown in the drawing, the compensator 608 may be a brake force compensation device (not shown) to compensate for brake force of the vehicle.

However, the scope of the inputters 102, 602, and 1402, the determiners 104, 604, 1404, and the controllers 106, 606, and 1406 is not limited thereto, and it should be noted that all control means capable of controlling overall operation of the vehicle, all input means capable of performing the input function, and all judgment means capable of performing the judgment function may also be easily applied to the present disclosure without departing from the scope and spirit of the present disclosure. The scope of the compensator 608 is not limited thereto, and all compensation means capable of compensating for brake force of the vehicle may also be applied to the present disclosure without departing from the scope and spirit of the present disclosure.

The vehicle control apparatuses 100, 600, 1100, and 1400 and the vehicle control methods 400, 500, 800~1000, 1200, 1300, 1600, and 1700 according to the embodiments of the present disclosure may determine that the current vehicle brake force value VB1 is in the abnormal state when vehicle movement occurs in the AVH retention time t1~t2. When vehicle movement successively occurs in the AVH retention time t1~t11, it is determined that the current vehicle brake force values VB1~VB5 are in the abnormal state.

Therefore, the vehicle control apparatuses 100, 600, 1100, and 1400 and the vehicle control methods 400, 500, 800 to 1000, 1200, 1300, 1600, and 1700 according to the embodiments of the present disclosure may determine whether the current brake force value of the vehicle is in the abnormal state during operation of the AVH device 10, thereby increasing the accuracy of judgment of vehicle brake force.

When the current vehicle brake force value VB1 is in the abnormal state, the vehicle control apparatus 600 and the vehicle control methods 800 and 900 according to the embodiment of the present disclosure may supply a target hydraulic pressure value VBC1 established in response to the current vehicle movement value VM1 to wheels 70, thereby compensating for brake force of the vehicle.

When the current vehicle brake force values VB1~VB5 are in the abnormal state, the vehicle control apparatus 600 and the vehicle control method 1000 according to the embodiment of the present disclosure may supply target hydraulic pressure values VBC1~VBC6 established in response to the current vehicle movement values VM1~VM5 to wheels 70 when vehicle movement successively occurs, thereby compensating for brake force of the vehicle.

Therefore, the vehicle control apparatus 600 and the vehicle control methods 800~1000 according to the embodiment of the present disclosure may compensate for brake force of the vehicle when the current vehicle brake force value is in the abnormal state, thereby increasing the efficiency of compensation of brake force of the vehicle.

When the target hydraulic pressure value VBC1 is supplied to wheels 70, the vehicle control apparatus 600 and the vehicle control methods 800 and 900 according to the embodiment of the present disclosure may turn off the AVH device 10.

When the target hydraulic pressure values VBC1~VBC6 are supplied to the wheels 70 in response to occurrence of successive vehicle movement, the vehicle control apparatus 600 and the vehicle control method 1000 according to the embodiment of the present disclosure may turn off the AVH device 10.

Therefore, the vehicle control apparatus 600 and the vehicle control methods 800~1000 according to the embodiment of the present disclosure may prevent malfunction of the AVH device 10 during compensation of brake force of the vehicle.

When vehicle movement occurs or when successive vehicle movement occurs, the vehicle control apparatus 1100 and the vehicle control methods 1200 and 1300 according to the embodiment of the present disclosure may identify that the current vehicle brake force value is in the abnormal state.

Therefore, the vehicle control apparatus 1100 and the vehicle control methods 1200 and 1300 according to the embodiment of the present disclosure may recognize a current brake state of the vehicle during activation of the AVH device 10, may suppress anxiety about the current brake state, thereby increasing reliability of the vehicle.

The vehicle control apparatus 1400 and the vehicle control methods 1600 and 1700 according to the embodiment of the present disclosure may perform switching to the EPB device 90 after lapse of the AVH retention time t1~t11, the vehicle control apparatus 1400 and the vehicle control methods 1600 and 1700 may further reduce the braking time while simultaneously increasing the efficiency of vehicle braking.

As is apparent from the above description, the vehicle control apparatus and the method for controlling the same according to the embodiments of the present disclosure may increase the accuracy of determining brake force of a vehicle.

The vehicle control apparatus and the method for controlling the same according to the embodiments of the present disclosure may increase the efficiency of compensation of brake force of a vehicle.

The vehicle control apparatus and the method for controlling the same according to the embodiments of the present disclosure may prevent malfunction of the AVH device during compensation of brake force of the vehicle.

The vehicle control apparatus and the method for controlling the same according to the embodiments of the present disclosure may increase reliability of the vehicle by suppressing anxiety about the current braking condition.

The vehicle control apparatus and the method for controlling the same according to the embodiments of the present disclosure may improve the efficiency of vehicle braking while simultaneously reducing the braking time of the vehicle.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A vehicle control apparatus comprising:
an inputter configured to receive an automatic vehicle hold (AVH) switch operation signal from an AVH device, and receive a current vehicle movement value sensed by a sensing device and a current vehicle brake force value of a brake device that generates brake force in response to activation of the AVH device;
a determiner configured to determine whether the received AVH switch operation signal transitions from an ON state to an AVH entry state, determine whether vehicle movement occurs on the basis of the received current vehicle movement value during an AVH retention time in the AVH entry state, and determine that the current vehicle brake force value is in an abnormal state when vehicle movement occurs; and
a controller configured to receive the current vehicle movement value and the current vehicle brake force value, and transmit a command for judgment to the determiner.

2. The vehicle control apparatus according to claim 1, further comprising:
a compensator configured to supply a target hydraulic pressure value established in response to the current vehicle movement value to one or more wheels during the abnormal state, thereby compensating for vehicle brake force.

3. The vehicle control apparatus according to claim 2, further comprising:
a controller configured to turn off the AVH device when the target hydraulic pressure value is supplied to the wheel.

4. The vehicle control apparatus according to claim 1, wherein:
the inputter receives a current vehicle gradient value and a current vehicle drive force value from the sensing device; and
the determiner determines whether a vehicle gradient state is at a flat level on the basis of the received current vehicle gradient value when the vehicle movement occurs,
determines whether the current vehicle drive force value is higher than the current vehicle brake force value when the vehicle gradient state is at the flat level,
determines whether the vehicle movement successively occurs on the basis of the received current vehicle movement value when the current vehicle drive force value is higher than the current vehicle brake force value, and
determines the abnormal state of the current vehicle brake force value when the vehicle movement successively occurs.

5. The vehicle control apparatus according to claim 4, further comprising:
a compensator configured to supply, when the abnormal state is decided, a target hydraulic pressure value established in response to the current vehicle movement value to one or more wheels when the vehicle movement has successively occurred, thereby compensating for vehicle brake force.

6. The vehicle control apparatus according to claim 5, further comprising:
a controller configured to turn off the AVH device when the target hydraulic pressure value is supplied to the wheel in response to successive occurrence of the vehicle movement.

7. The vehicle control apparatus according to claim 1, further comprising:
an identifier configured to identify that the current vehicle brake force value is in the abnormal state, when the vehicle movement occurs.

8. The vehicle control apparatus according to claim 4, further comprising:
an identifier configured to identify that the current vehicle brake force value is in the abnormal state when the vehicle movement successively occurs.

9. The vehicle control apparatus according to claim 1, wherein:
the determiner determines whether the AVH retention time has elapsed; and
the controller performs switching to an electronic parking brake (EPB) device after lapse of the AVH retention time.

10. A method for controlling a vehicle comprising:
receiving an automatic vehicle hold (AVH) switch operation signal from an AVH device;
determining whether the received AVH switch operation signal transitions from an ON state to an AVH entry state;
receiving a current vehicle movement value sensed by a sensing device and a current vehicle brake force value of a brake device that generates brake force in response to activation of the AVH device; and
determining whether vehicle movement occurs on the basis of the received current vehicle movement value during an AVH retention time in the AVH entry state, and determining that the current vehicle brake force value is in an abnormal state when the vehicle movement occurs.

11. The method according to claim 10, further comprising:
when the abnormal state is decided, supplying a target hydraulic pressure value established in response to the current vehicle movement value to one or more wheels, thereby compensating for brake force of the vehicle.

12. The method according to claim 11, further comprising:
turning off the AVH device when the target hydraulic pressure value is supplied to the wheel.

13. The method according to claim 10, further comprising:
receiving a current vehicle gradient value and a current vehicle drive force value from the sensing device;
determining whether a vehicle gradient state is at a flat level on the basis of the received current vehicle gradient value when the vehicle movement occurs;
determining whether the current vehicle drive force value is higher than the current vehicle brake force value when the vehicle gradient state is at the flat level,
determining whether the vehicle movement successively occurs on the basis of the received current vehicle movement value when the current vehicle drive force value is higher than the current vehicle brake force value; and
determining the abnormal state of the current vehicle brake force value when the vehicle movement successively occurs.

14. The method according to claim 13, further comprising:

when the abnormal state is decided, supplying a target hydraulic pressure value established in response to the current vehicle movement value to one or more wheels when the vehicle movement has successively occurred, thereby compensating for vehicle brake force.

15. The method according to claim 14, further comprising:
turning off the AVH device when the target hydraulic pressure value is supplied to the wheel in response to successive occurrence of the vehicle movement.

16. The method according to claim 10, further comprising:
identifying that the current vehicle brake force value is in the abnormal state, when the vehicle movement occurs.

17. The method according to claim 13, further comprising:
identifying that the current vehicle brake force value is in the abnormal state, when the vehicle movement successively occurs.

18. The method according to claim 10, further comprising:
determining whether the AVH retention time has elapsed; and
performing switching to an electronic parking brake (EPB) device after lapse of the AVH retention time.

* * * * *